(12) United States Patent
Drillet et al.

(10) Patent No.: US 11,773,464 B2
(45) Date of Patent: *Oct. 3, 2023

(54) PRESS HARDENING METHOD

(71) Applicant: ArcelorMittal, Luxembourg (LU)

(72) Inventors: Pascal Drillet, Rozerieulles (FR); Raisa Grigorieva, Metz (FR); Thierry Sturel, Le Ban Saint Martin (FR); Cédric Georges, Novilles-les-bois (FR); Brahim Nabi, Leuven (BE); Florin Duminica, Tilff (BE)

(73) Assignee: ArcelorMittal, Luxembourg (LU)

( * ) Notice: Subject to any disclaimer, the term of this patent is extended or adjusted under 35 U.S.C. 154(b) by 77 days.

This patent is subject to a terminal disclaimer.

(21) Appl. No.: 17/275,157

(22) PCT Filed: Sep. 20, 2019

(86) PCT No.: PCT/IB2019/057970
§ 371 (c)(1),
(2) Date: Mar. 10, 2021

(87) PCT Pub. No.: WO2020/070575
PCT Pub. Date: Apr. 9, 2020

(65) Prior Publication Data
US 2022/0042129 A1 Feb. 10, 2022

(30) Foreign Application Priority Data
Oct. 4, 2018 (WO) .................. PCT/IB2018/057719

(51) Int. Cl.
C21D 9/46 (2006.01)
C21D 1/673 (2006.01)
C21D 1/70 (2006.01)
C23C 2/28 (2006.01)
B32B 15/01 (2006.01)
C22C 21/02 (2006.01)
C22C 38/54 (2006.01)
C22C 38/50 (2006.01)
C22C 38/46 (2006.01)
C22C 38/44 (2006.01)
C22C 38/00 (2006.01)
C22C 38/02 (2006.01)
C22C 38/04 (2006.01)
(Continued)

(52) U.S. Cl.
CPC .............. C21D 9/46 (2013.01); B32B 15/012 (2013.01); B32B 15/013 (2013.01); C21D 1/673 (2013.01); C21D 1/70 (2013.01); C22C 21/02 (2013.01); C22C 38/001 (2013.01); C22C 38/002 (2013.01); C22C 38/008 (2013.01); C22C 38/02 (2013.01); C22C 38/04 (2013.01); C22C 38/06 (2013.01); C22C 38/42 (2013.01); C22C 38/44 (2013.01); C22C 38/46 (2013.01); C22C 38/48 (2013.01); C22C 38/50 (2013.01); C22C 38/54 (2013.01); C23C 2/28 (2013.01); C21D 2211/002 (2013.01); C21D 2211/005 (2013.01); C21D 2211/008 (2013.01)

(58) Field of Classification Search
CPC ..... B32B 15/01; B32B 15/012; B32B 15/013; C21D 1/673; C21D 1/70; C21D 2211/002; C21D 2211/005; C21D 2211/008; C21D 9/46; C22C 21/02; C22C 38/001; C22C 38/002; C22C 38/008; C22C 38/02; C22C 38/04; C22C 38/06; C22C 38/42; C22C 38/44; C22C 38/46; C22C 38/48; C22C 38/50; C22C 38/54; C22C 2/26; C22C 2/28

See application file for complete search history.

(56) References Cited

U.S. PATENT DOCUMENTS

2007/0163685 A1 * 7/2007 Kusumi .................... C23C 2/28
148/634
2010/0003538 A1 1/2010 Nikolov et al.
(Continued)

FOREIGN PATENT DOCUMENTS

CN 1984732 A 6/2007
EP 1878811 1/2008
(Continued)

OTHER PUBLICATIONS

International Search Report of PCT/IB2019/057970, dated Nov. 22, 2019.
(Continued)

Primary Examiner — Jenny R Wu
(74) Attorney, Agent, or Firm — Davidson, Davidson & Kappel, LLC

(57) ABSTRACT

A press hardening method includes the following steps providing a carbon steel sheet coated with a barrier precoating including nickel and chromium wherein the weight ratio Ni/Cr is between 1.5 and 9, cutting the sheet to obtain a blank, thermal treatment of the blank in an atmosphere having an oxidizing power equal or higher than that of an atmosphere consisting of 1% by volume of oxygen and equal or smaller than that of an atmosphere consisting of 50% by volume of oxygen, such atmosphere having a dew point between −30 and +30° C., transfer of the blank into a press tool, hot-forming of the blank to obtain a part, cooling of the part to obtain a microstructure in steel being martensitic or martensito-bainitic or made of at least 75 wt. % of equiaxed ferrite, from 5 to 20 wt. % of martensite and bainite in amount less than or equal to 10 wt. %.

30 Claims, No Drawings

(51) Int. Cl.
*C22C 38/06* (2006.01)
*C22C 38/42* (2006.01)
*C22C 38/48* (2006.01)

(56) References Cited

U.S. PATENT DOCUMENTS

| | | | |
|---|---|---|---|
| 2013/0068350 A1* | 3/2013 | Steins | C23C 8/10 |
| | | | 148/277 |
| 2015/0314567 A1* | 11/2015 | Böger | C23C 2/12 |
| | | | 428/656 |
| 2016/0031186 A1* | 2/2016 | Mourer | C23C 4/18 |
| | | | 428/656 |
| 2016/0222484 A1 | 8/2016 | Koyer et al. | |
| 2017/0260599 A1 | 9/2017 | Puerta Velasquez | |
| 2017/0298465 A1 | 10/2017 | Cobo et al. | |
| 2018/0044774 A1 | 2/2018 | Allely et al. | |
| 2019/0144963 A1* | 5/2019 | Georges | C21D 6/004 |
| | | | 428/667 |

FOREIGN PATENT DOCUMENTS

| | | | | |
|---|---|---|---|---|
| JP | 2005074468 A | | 3/2005 | |
| JP | 2007302982 A | | 11/2007 | |
| JP | 2011122207 A | * | 6/2011 | ........... C23C 10/28 |
| WO | WO2011104443 A1 | | 9/2011 | |
| WO | WO2017/187255 | | 11/2017 | |
| WO | WO2017187215 A1 | | 11/2017 | |
| WO | WO-2017187255 A1 | * | 11/2017 | ........... B32B 15/015 |

OTHER PUBLICATIONS

Lesage et al: "Role of hydrogen on adhesion of NiCr thermal sprayed coatings," Thin Solid Films, Dec. 1, 2000, Elsevier, Amsterdam, NL, vol. 377-378, pp. 675-680.

* cited by examiner

PRESS HARDENING METHOD

The present invention relates to a press hardening method comprising the provision of a carbon steel sheet coated with a barrier pre-coating which better inhibits hydrogen adsorption and a part having excellent resistance to delayed cracking. The invention is particularly well suited for the manufacture of automotive vehicles.

BACKGROUND

It is known that certain applications, especially in the automotive field, require metal structures to be further lightened and strengthened in the event of an impact, and also to have good drawability. To this end, steels having improved mechanical properties are usually used, such steel being formed by cold and hot-stamping.

However, it is known that the sensitivity to delayed cracking increases with the mechanical strength, in particular after certain cold-forming or hot-forming operations since high residual stresses are liable to remain after deformation. In combination with atomic hydrogen possibly present in the Carbon steel sheet, these stresses are liable to result in delayed cracking, that is to say cracking that occurs a certain time after the deformation itself. Hydrogen may progressively build up by diffusion into the crystal lattice defects, such as the matrix/inclusion interfaces, twin boundaries and grain boundaries. It is in the latter defects that hydrogen may become harmful when it reaches a critical concentration after a certain time. This delay results from the residual stress distribution field and from the kinetics of hydrogen diffusion, the hydrogen diffusion coefficient at room temperature being low. In addition, hydrogen localized at the grain boundaries weakens their cohesion and favors the appearance of delayed intergranular cracks.

To overcome this problem, it is known to pre-coat a carbon steel sheet with a barrier pre-coating comprising nickel and chromium wherein the weight ratio Ni/Cr is between 1.5 and 9 to prevent the adsorption of hydrogen into the steel during the austenitization thermal treatment.

For example, the patent publication WO2017/187255 discloses a press hardening method comprises the following steps:
A. the provision of a carbon steel sheet coated with a barrier pre-coating comprising nickel and chromium wherein the weight ratio Ni/Cr is between 1.5 and 9,
B. the cutting of the coated carbon steel sheet to obtain a blank,
C. the thermal treatment of the blank,
D. the transfer of the blank into a press tool,
E. the hot-forming of the blank to obtain a part,
F. the cooling of the part obtained at step E) in order to obtain a microstructure in steel being martensitic or martensito-bainitic or made of at least 75% of equiaxed ferrite, from 5 to 20% of martensite and bainite in amount less than or equal to 0%.

In this patent application, in step C), the thermal treatment can be performed in an inert atmosphere or an atmosphere comprising air. All the Examples are performed in an atmosphere consisting of nitrogen.

Although the hydrogen absorption during the austenitization treatment is improved, it is not enough to obtain a part having an excellent resistance to delayed cracking. Indeed, even if the pre-coating barrier decreases the hydrogen absorption, too many hydrogen molecules are still absorbed by the carbon steel sheet.

SUMMARY OF THE INVENTION

It is an object of the present invention to provide a press hardening method wherein the hydrogen adsorption into the carbon steel sheet is prevented or reduced. It aims to make available a part having excellent resistance to delayed cracking obtainable by said press-hardening method including hot-forming.

The present invention provides a press hardening method comprising the following steps:
A. the provision of a carbon steel sheet coated with a barrier pre-coating comprising nickel and chromium wherein the weight ratio Ni/Cr is between 1.5 and 9,
B. the cutting of the coated carbon steel sheet to obtain a blank,
C. the thermal treatment of the blank in an atmosphere having an oxidizing power equal or higher than that of an atmosphere consisting of 1% by volume of oxygen and equal or smaller than that of an atmosphere consisting of 50% by volume of oxygen, such atmosphere having a dew point between −30 and +30° C.,
D. the transfer of the blank into a press tool,
E. the hot-forming of the blank to obtain a part,
F. the cooling of the part obtained at step E) in order to obtain a microstructure in steel being martensitic or martensito-bainitic or made of at least 75 wt. % of equiaxed ferrite, from 5 to 20 wt. % of martensite and bainite in amount less than or equal to 10 wt. %.

The invention also covers a part according to the method.

Finally, the invention covers the use of such part for the manufacture of an automotive vehicle.

Other characteristics and advantages of the invention will become apparent from the following detailed description of the invention.

DETAILED DESCRIPTION

The following terms will be defined:
all percentage "%" are defined by weight and
"carbon steel sheet" means a steel sheet having less than 10.5% by weight of chromium. For example, stainless steel is not included in the definition of a carbon steel sheet.

Any steel can be advantageously used in the frame of the invention. However, in case steel having high mechanical strength is needed, in particular for parts of structure of automotive vehicle, steel having a tensile resistance superior to 500 MPa, advantageously between 500 and 2000 MPa before or after heat-treatment, can be used. The weight composition of carbon steel sheet is preferably as follows: 0.03%≤C≤0.50%; 0.3%≤Mn≤3.0%; 0.05%≤Si≤0.8%; 0.015%≤Ti≤0.2%; 0.005%≤Al≤0.1%; 0%≤Cr≤2.50%; 0%≤S≤0.05%; 0%≤0.1%; 0≤B≤0.010%; 0≤Ni≤2.5%; 0≤Mo≤0.7%; 0≤Nb≤0.15%; 0%≤N≤0.015%; 0%≤Cu≤0.15%; 0%≤Ca≤0.01%; 0%≤W≤0.35%, the balance being iron and unavoidable impurities from the manufacture of steel.

For example, the carbon steel sheet is 22MnB5 with the following composition: 0.20%≤C≤0.25%; 0.15%≤Si≤0.35%; 1.10%≤Mn≤1.40%; 0%≤Cr≤0.30%; 0%≤Mo≤0.35%; 0%≤P≤0.025%; 0%≤S≤0.005%; 0.020%≤Ti≤0.060%; 0.020%≤Al≤0.060%; 0.002%≤B≤0.004%, the balance being iron and unavoidable impurities from the manufacture of steel.

The carbon steel sheet can be Usibor®2000 with the following composition: 0.24%≤C≤0.38%; 0.40%≤Mn≤3%; 0.10%≤Si≤0.70%; 0.015%≤Al≤0.070%; 0%≤Cr≤2%; 0.25%≤Ni≤2%; 0.020%≤Ti≤0.10%; 0%≤Nb≤0.060%;

0.0005%≤B≤0.0040%; 0.003%≤N≤0.010%; 0.0001%≤S≤0.005%; 0.0001%≤P≤0.025%; it being understood that the contents of titanium and nitrogen satisfy Ti/N>3.42; and that the contents of carbon, manganese, chromium and silicon satisfy:

$$2.6\ C + \frac{Mn}{5.3} + \frac{Cr}{13} + \frac{Si}{15} \geq 1.1\%$$

the composition optionally comprising one or more of the following: 0.05%≤Mo≤0.65%; 0.001%≤W≤0.30%; 0.0005%≤Ca≤0.005%, the balance being iron and unavoidable impurities from the manufacture of steel.

For example, the Carbon steel sheet is Ductibor®500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, the balance being iron and unavoidable impurities from the manufacture of steel.

Carbon steel sheet can be obtained by hot rolling and optionally cold rolling depending on the desired thickness, which can be for example between 0.7 and 3.0 mm.

The invention relates to a press hardening method comprising the following steps:
A. the provision of a carbon steel sheet coated with a barrier pre-coating comprising nickel and chromium wherein the weight ratio Ni/Cr is between 1.5 and 9,
B. the cutting of the coated carbon steel sheet to obtain a blank,
C. the thermal treatment of the blank in an atmosphere having an oxidizing power equal or higher than that of an atmosphere consisting of 1% by volume of oxygen and equal or smaller than that of an atmosphere consisting of 50% by volume of oxygen, such atmosphere having a dew point between −30 and +30° C.,
D. the transfer of the blank into a press tool,
E. the hot-forming of the blank to obtain a part,
F. the cooling of the part obtained at step E) in order to obtain a microstructure in steel being martensitic or martensito-bainitic or made of at least 75 wt. % of equiaxed ferrite, from 5 to 20 wt. % of martensite and bainite in amount less than or equal to 10 wt. %.

Indeed, without willing to be bound by any theory, the inventors have surprisingly found that when the carbon steel sheet is pre-coated with a barrier coating comprising nickel and chromium, the ratio Ni/Cr being in the above specific range, and when the thermal treatment is performed in the above atmosphere, this barrier effect of the pre-coating is further improved preventing even more the adsorption of hydrogen into the carbon steel sheet. Indeed, on the contrary to an atmosphere consisting of nitrogen with which a thinner layer of selective oxides are formed on the surface of the barrier pre-coating during the thermal treatment, in particular the austenitization treatment, it is believed that thermodynamically stable oxides are formed on the surface of the barrier pre-coating with a low hydrogen diffusion kinetic. These thermodynamically stable oxides further reduce $H_2$ adsorption.

One of the essential characteristics of the method according to the invention consists in choosing the atmosphere having an oxidizing power equal or higher than that of an atmosphere consisting of 1% by volume of oxygen and equal or smaller than that of an atmosphere consisting of 50% by volume of oxygen. The atmosphere may in particular be made of $N_2$ or Ar or mixtures of nitrogen or argon and gas oxidants such as, for example, oxygen, mixtures of CO and $CO_2$ or mixtures of $H_2$ and $H_2O$. it is also possible to use mixtures of CO and $CO_2$ or mixtures of $H_2$ and $H_2$ without addition of inert gas.

Preferably, in step C), the atmosphere has an oxidizing power equal or higher than that of an atmosphere consisting of 10% by volume of oxygen and equal or smaller than that of an atmosphere consisting of 30% by volume of oxygen. For example, the atmosphere is air, i.e. consisting of about 78% of $N_2$, about 21% of $O_2$ and other gas such as rare gases, carbon dioxide and methane.

Preferably, in step C), the dew point is between −20 and +20° C. and advantageously between −15° C. and +15° C. Indeed, without willing to be bound by any theory, it is believed that when the dew point is in the above range, the layer of thermodynamically stable oxides reduce even more the $H_2$ adsorption during the thermal treatment.

Optionally, in step A), the barrier pre-coating comprises impurities chosen from Sr, Sb, Pb, Ti, Ca, Mn, Sn, La, Ce, Cr, Zr or Bi, the content by weight of each additional element being inferior to 0.3% by weight.

Advantageously, in step A), the barrier pre-coating comprises from 55 to 90%, preferably from 70 to 90%, more preferably from 75 to 85% by weight of nickel.

Preferably, in step A), the barrier pre-coating comprises from 10 to 40%, preferably from 10 to 30% and advantageously from 15 to 25% of chromium.

In a preferred embodiment, in step A), the barrier pre-coating does not comprise at least one of the elements chosen from Al, Fe, Si, Zn, B, N and Mo. Indeed, without willing to be bound by any theory, there is a risk that the presence of at least one of these elements decreases the barrier effect of the coating.

Preferably, in step A), the barrier pre-coating consists of Cr and Ni, i.e. the barrier coating comprises only Ni and Cr and optional impurities.

Preferably, in step A), the barrier pre-coating has a thickness between 10 and 550 nm and more preferably between 10 and 90. In another preferred embodiment, the thickness is between 150 and 250 nm. For example, the thickness of the barrier coating is of 50 or 200 nm.

Without willing to be bound by any theory, it seems that when the barrier pre-coating is below 10 nm, there is a risk that hydrogen absorbs into steel because the barrier coating does not cover enough the carbon steel sheet. When the barrier pre-coating is above 550 nm, it seems that there is a risk that the barrier coating becomes more brittle and that the hydrogen absorption begins due to the barrier coating brittleness.

In step A), the carbon steel sheet can be directly topped by an anticorrosion pre-coating, this anticorrosion pre-coating layer being directly topped by the barrier pre-coating. For example, the anticorrosion pre-coating comprises at least one of the metal selected from the group comprising zinc, aluminum, copper, magnesium, titanium, nickel, chromium, manganese and their alloys. Preferably, the anticorrosion coating is based on aluminum or based on zinc.

In a preferred embodiment, the anticorrosion pre-coating based on aluminum comprises less than 15% Si, less than 5.0% Fe, optionally 0.1 to 8.0% Mg and optionally 0.1 to 30.0% Zn, the remainder being Al. For example, the anticorrosion coating is AluSi®.

In another preferred embodiment, the anticorrosion pre-coating based on zinc comprises less than 6.0% Al, less than 6.0% of Mg, the remainder being Zn. For example, the anticorrosion coating is a zinc coating so to obtain the following product: Usibor® GI.

The anticorrosion pre-coating can also comprise impurities and residual elements such iron with a content up to 5.0%, preferably 3.0%, by weight.

The pre-coatings can be deposited by any methods known to the man skilled in the art, for example hot-dip galvanization process, roll coating, electrogalvanization process, physical vapor deposition such as jet vapor deposition, magnetron sputtering or electron beam induced deposition. Preferably, the barrier pre-coating is deposited by electron beam induced deposition or roll coating. After the deposition of the pre-coatings, a skin-pass can be realized and allows work hardening the coated carbon steel sheet and giving it a roughness facilitating the subsequent shaping. A degreasing and a surface treatment can be applied in order to improve for example adhesive bonding or corrosion resistance.

After the provision of the carbon steel sheet pre-coated with the metallic coating according to the present invention, the coated carbon steel sheet is cut to obtain a blank. A thermal treatment is applied to the blank in a furnace. Preferably, the thermal treatment is performed under non-protective atmosphere or under protective atmosphere at a temperature between 800 and 950° C. More preferably, the thermal treatment is performed at an austenitization temperature Tm usually between 840 and 950° C., preferably 880 to 930° C. Advantageously, said blank is maintained during a dwell time tm between 1 to 12 minutes, preferably between 3 to 9 minutes. During the thermal treatment before the hot-forming, the coating forms an alloy layer having a high resistance to corrosion, abrasion, wear and fatigue.

At ambient temperature, the mechanism of absorption of hydrogen into steel is different from high temperature, in particular the austenitization treatment. Indeed, usually at high temperature, the water in the furnace dissociates at the surface of the steel sheet into hydrogen and oxygen. Without willing to be bound by any theory, it is believed that the barrier coating comprising nickel and chromium can prevent water dissociation at the barrier coating surface and also prevent the hydrogen diffusion through the coating. With an atmosphere having an oxidizing power equal or higher than that of an atmosphere consisting of 1% volume percent oxygen and equal or smaller than that of an atmosphere consisting of 50% by volume of oxygen, it is believed that the oxides being thermodynamically stable further inhibit the water dissociation.

After the thermal treatment, the blank is then transferred to a hot-forming tool and hot-formed at a temperature between 600 and 830° C. The hot-forming can be the hot-stamping or the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

A hardened part having excellent resistance to delayed cracking according to the invention is thus obtained by hot forming. Preferably, the part comprises a carbon steel sheet coated with a barrier pre-coating comprising nickel and chromium and an oxide layer comprising thermodynamically stable iron, nickel and chromium oxides such barrier coating being alloyed through diffusion with the carbon steel sheet. More preferably, a part comprises a carbon steel sheet coated with a barrier pre-coating comprising iron, nickel and chromium and an oxide layer comprising thermodynamically stable nickel and chromium oxides, such barrier coating being alloyed through diffusion with the carbon steel sheet. Indeed, without willing to be bound by any theory, it seems that iron from steel diffuses to the surface of the barrier pre-coating during the thermal treatment. With the atmosphere of step C), it is believed that iron, nickel and chromium slowly oxidize forming thermodynamically stable oxides preventing $H_2$ adsorption into the carbon steel sheet.

Preferably, the thermodynamically stable chromium, nickel and iron oxides can comprise respectively $Cr_2O_3$; NiO; FeO, $Fe_2O_3$ and/or $Fe_3O_4$.

Preferably, the thickness of the oxide layer is between 10 and 550 nm.

In a preferred embodiment, the part is a press hardened steel part having a variable thickness, i.e. the press hardened steel part of the invention can have a thickness which is not uniform but which can vary. Indeed, it is possible to achieve the desired mechanical resistance level in the zones which are the most subjected to external stresses, and to save weight in the other zones of the press hardened part, thus contributing to the vehicle weight reduction. In particular, the parts with non-uniform thickness can be produced by continuous flexible rolling, i.e. by a process wherein the sheet thickness obtained after rolling is variable in the rolling direction, in relationship with the load which has been applied through the rollers to the sheet during the rolling process.

Thus, within the conditions of the invention, it is possible to manufacture advantageously vehicle parts with varying thickness in order to obtain for example a tailored rolled blank. Specifically, the part can be a front rail, a seat cross member, a side sill member, a dash panel cross member, a front floor reinforcement, a rear floor cross member, a rear rail, a B-pillar, a door ring or a shotgun.

For automotive application, after phosphating step, the part is dipped in an e-coating bath. Usually, the thickness of the phosphate layer is between 1 and 2 μm and the thickness of the e-coating layer is between 15 and 25 μm, preferably inferior or equal to 20 μm. The cataphoresis layer ensures an additional protection against corrosion. After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention will now be explained in trials carried out for information only. They are not limiting.

EXAMPLES

For all samples, carbon steel sheets used are 22MnB5. The composition of the steel is as follows: C=0.2252%; Mn=1.1735%; P=0.0126%, S=0.0009%; N=0.0037%; Si=0.2534%; Cu=0.0187%; Ni=0.0197%; Cr=0.180%; Sn=0.004%; Al=0.0371%; Nb=0.008%; Ti=0.0382%; B=0.0028%; Mo=0.0017%; As=0.0023% et V=0.0284%.

Some carbon steel sheets are coated with a 1$^{st}$ coating being an anticorrosion coating called hereinafter "AluSi®". This coating comprises 9% by weight of Silicon, 3% by weight of iron, the balance being aluminum. It is deposited by hot-dip galvanization.

Some carbon steel sheets are coated with a 2$^{nd}$ coating deposited by magnetron sputtering.

Example 1: Hydrogen Test

This test is used to determine the quantity of hydrogen adsorbed during the austenitization thermal treatment of a press hardening method.

Trials are carbon steel sheets coated with, optionally a 1$^{st}$ coating being AluSi® (25 μm) and, a 2$^{nd}$ coating comprising 80% of Ni and 20% of Cr.

After the deposition of the coated carbon steel sheets, coated trials were cut in order to obtain a blank. Blanks were then heated at a temperature of 900° C. during a dwell time varying between 5 and 10 minutes. The atmosphere during the thermal treatment was air or nitrogen with a dew point between −15° C. and +15° C. Blanks were transferred into a press tool and hot-stamped in order to obtain parts having an omega shape. Then, parts were cooled by dipping trials into warm water to obtain a hardening by martensitic transformation.

Finally, the hydrogen amount adsorbed by the trials during the heat treatment was measured by thermic desorption using a TDA or Thermal Desorption Analyser. To this end, each trial was placed in a quartz room and heated slowly in an infra-red furnace under a nitrogen flow. The released mixture hydrogen/nitrogen was picked up by a leak detector and the hydrogen concentration was measured by a mass spectrometer. Results are shown in the following Table 1:

| Trials | Atmosphere | Dew Point (° C.) | 2$^{nd}$ coating | Ratio Ni/Cr | Thickness 2$^{nd}$ coating (nm) | H$_2$ amount (ppm by mass) |
|---|---|---|---|---|---|---|
| 1 | air | −15° C. | — | — | — | 0.2 |
| 2 | N$_2$ | −15° C. | — | — | — | 0.5 |
| 3* | air | −15° C. | Ni/Cr 80/20 | 4 | 50 | 0.1 |
| 4 | N$_2$ | −15° C. | Ni/Cr 80/20 | 4 | 50 | 0.24 |
| 5 | air | 0° C. | — | — | — | 0.45 |
| 6 | N$_2$ | 0° C. | — | — | — | 0.68 |
| 7* | air | 0° C. | Ni/Cr 80/20 | 4 | 50 | 0.15 |
| 8 | N$_2$ | 0° C. | Ni/Cr 80/20 | 4 | 50 | 0.35 |
| 9 | air | +15° C. | — | — | — | 0.55 |
| 10 | N$_2$ | +15° C. | — | — | — | 0.8 |
| 11* | air | +15° C. | Ni/Cr 80/20 | 4 | 30 | 0.33 |
| 12 | N$_2$ | +15° C. | Ni/Cr 80/20 | 4 | 30 | 0.5 |
| 13 | air | +15° C. | — | — | — | 0.6 |
| 14 | N$_2$ | +15° C. | — | — | — | 0.8 |
| 15* | air | +15° C. | Ni/Cr 80/20 | 4 | 50 | 0.28 |
| 16 | N$_2$ | +15° C. | Ni/Cr 80/20 | 4 | 50 | 0.6 |
| 17* | air | +15° C. | Ni/Cr 80/20 | 4 | 70 | 0.25 |
| 18 | N$_2$ | +15° C. | Ni/Cr 80/20 | 4 | 70 | 0.5 |
| 19* | Air | +15° C. | Ni/Cr 80/20 | 4 | 100 | 0.2 |
| 20 | N$_2$ | +15° C. | Ni/Cr 80/20 | 4 | 100 | 0.5 |
| 21* | air | +15° C. | Ni/Cr 80/20 | 4 | 200 | 0.2 |
| 22 | N$_2$ | +15° C. | Ni/Cr 80/20 | 4 | 200 | 0.4 |

*examples according to the invention.

Trials according to the present invention release a very low amount of hydrogen compared to comparative examples.

What is claimed is:

1. A press hardening method comprising the following steps:
    A. providing a carbon steel sheet coated with a barrier pre-coating comprising nickel and chromium wherein a weight ratio Ni/Cr is between 1.5 and 9,
    B. cutting the coated carbon steel sheet to obtain a blank,
    C. thermally treating the blank in an atmosphere having an oxidizing power equal or higher than that of an atmosphere of 1% by volume of oxygen and equal or smaller than that of an atmosphere of 50% by volume of oxygen, the atmosphere having a dew point between −30 and +30° C.,
    D. transferring the blank into a press tool,
    E. hot-forming the blank to obtain a part,
    F. cooling of part obtained at step E) in order to obtain a microstructure in steel being martensitic or martensito-bainitic or made of at least 75 wt. % of equiaxed ferrite, from 5 to 20 wt. % of martensite and bainite in amount less than or equal to 10 wt. %.

2. The method as recited in claim 1 wherein in step A), the weight ratio Ni/Cr is between 2.3 and 9.

3. The method as recited in claim 2 wherein in step C), the atmosphere has an oxidizing power equal or higher than that of an atmosphere of 10% by volume of oxygen and equal or smaller than that of an atmosphere of 30% by volume of oxygen.

4. The method as recited in claim 3 wherein in step C) the atmosphere is air.

5. The method as recited in claim 4, wherein in step C) the atmosphere consists of about 78% of N$_2$, about 21% of O$_2$ and other gases.

6. The method as recited in claim 5, wherein in step C) the other gases are selected from a group consisting of rare gases, carbon dioxide and methane.

7. The method as recited in claim 1 wherein in step C), the dew point is between −20 and +20° C.

8. The method as recited in claim 1 wherein in step A), the barrier pre-coating includes from 55 to 90% by weight of nickel.

9. The method as recited in claim 8 wherein in step A), the barrier pre-coating includes from 70 to 90% by weight of nickel.

10. The method as recited in claim 1 wherein in step A), the barrier pre-coating includes from 10 to 40% of chromium.

11. The method as recited in claim 10 wherein in step A), the barrier pre-coating comprises from 10 to 30% of chromium.

12. The method as recited in claim 11, wherein in step A), the barrier pre-coating comprises from 15 to 25% of chromium.

13. The method as recited in claim 1 wherein in step A), the barrier pre-coating does not includes at least one of the elements chosen from the group consisting of Al, Fe, Si, Zn, B, N and Mo.

14. The method as recited in claim 1 wherein in step A), the barrier pre-coating consists of Cr and Ni.

15. The method as recited in claim 14 wherein in step A), the barrier pre-coating has a thickness between 10 and 550 nm.

16. The method as recited in claim 15 wherein in step A), the thickness of the barrier pre-coating is between 10 and 90 nm.

17. The method as recited in claim 15 wherein in step A), the thickness of the barrier pre-coating is between 150 and 250 nm.

18. The method as recited in claim 1 wherein in step A), the carbon steel sheet is directly topped by an anticorrosion pre-coating layer, the anticorrosion pre-coating layer being directly topped by the barrier pre-coating.

19. The method as recited in claim 18 wherein in step A), the anticorrosion pre-coating includes at least one of the metal selected from the group consisting of zinc, aluminum, copper, magnesium, titanium, nickel, chromium, manganese and their alloys.

20. The method as recited in claim 19 wherein in step A), the anticorrosion pre-coating is based on aluminum or based on zinc.

21. The method as recited in claim 20 wherein in step A), the anticorrosion pre-coating is based on aluminum and includes less than 15% Si, less than 5.0% Fe, optionally 0.1 to 8.0% Mg and optionally 0.1 to 30.0% Zn, a remainder being Al.

22. The method as recited in claim 20 wherein in step A), the anticorrosion pre-coating is based on zinc and includes less than 6.0% Al, less than 6.0% of Mg, a remainder being Zn.

23. The method as recited in claim 1 wherein the barrier pre-coating of step A) is deposited by physical vapor deposition, by electro-galvanization, hot-dip galvanization or roll-coating.

24. The method as recited in claim 1 wherein in step C), the thermal treatment is performed at a temperature between 800 and 950° C.

25. The method as recited in claim 24 wherein in step C), the thermal treatment is performed at a temperature between 840 and 970° C. to obtain a fully austenitic microstructure in the steel.

26. The method as recited in claim 1 wherein in step C), the thermal treatment is performed during a dwell time between 1 to 12 minutes.

27. The method as recited in claim 1 wherein during step E) the hot-forming of the blank is at a temperature between 600 and 830° C.

28. A method for manufacturing a vehicle comprising performing the method as recited in claim 1.

29. The method as recited in claim 1, wherein in step C), the dew point is between −15 and +15° C.

30. The method as recited in claim 1, wherein the carbon steel sheet is directly topped by said barrier pre-coating, and wherein said thermal heat treatment effects an alloying of the barrier pre-coating with the carbon sheet through diffusion.

\* \* \* \* \*